Oct. 28, 1924.

J. LANG 1,513,613

SUGAR BEET DRILL

Filed April 8, 1922      4 Sheets-Sheet 3

WITNESSES
Guy M. Spring
Louis W. Helmuth

Inventor
Joseph Lang

By Richard B. Owen, Attorney

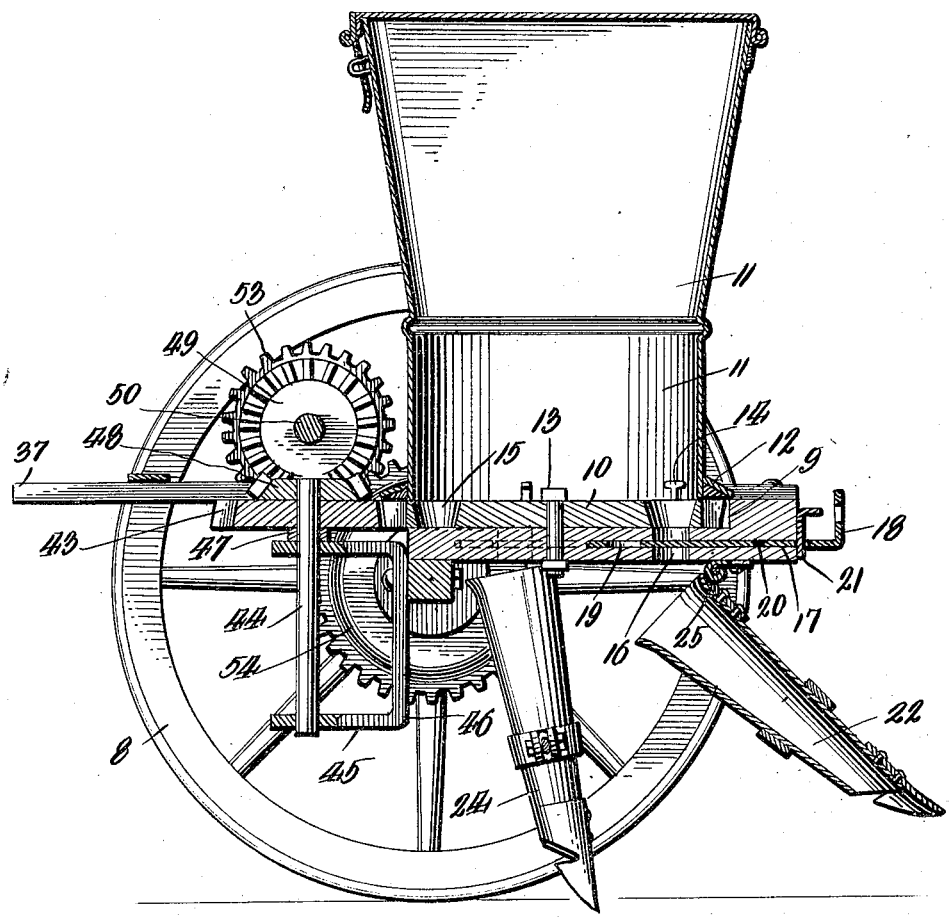

Patented Oct. 28, 1924.

1,513,613

UNITED STATES PATENT OFFICE.

JOSEPH LANG, OF ROSEBUSH, MICHIGAN, ASSIGNOR OF ONE-THIRD TO MARY LANG, OF CLEVELAND, OHIO.

SUGAR-BEET DRILL.

Application filed April 8, 1922. Serial No. 550,594.

*To all whom it may concern:*

Be it known that I, JOSEPH LANG, a citizen of the United States, residing at Rosebush, in the county of Isabella and State of Michigan, have invented certain new and useful Improvements in Sugar-Beet Drills, of which the following is a specification.

This invention relates to new and useful improvements in planters generally and more particularly to sugar beet drills, the primary object of the invention being to provide a planter with a plurality of seed dropping mechanisms each including a plurality of seed discharge outlets which are spaced transversely of the planter, associated with means for controlling the outlets so that the distance between rows can be varied at the will of the operator and with very little difficulty.

Another important object of the invention is to provide an arrangement whereby one or more rows may be planted out of the same seed hopper at the same time, and by the addition of another similar arrangement of seed dropping mechanism, a plurality of rows can be drilled or planted simultaneously and the distances between the rows can be varied easily during the planting operation of the machine.

A further important object of the invention resides in the arrangement of seed planting drills in which a plurality of drills are provided for receiving seed from the same seed discharging mechanism, the drills being arranged one in advance of the other and capable of being thrown out of operation or into operation so that the distance between the seeds planted by the same seed dropping mechanism can be varied at will.

Still another object of the invention resides in the provision of a plurality of independently operable seed discharging regulators for each seed dropping mechanism employing a plurality of seed discharge outlets whereby any one or more of the outlets can be opened or closed without interfering with the discharging process of the others.

A further object of the invention resides in the provision of a planter embodying a plurality of spaced grain drills which are movable with respect to the planter whereby one set of drills can be simultaneously operated independently of another set of drills.

The resultant features of the foregoing objects are that a great saving of seed is effected by my present planter, that the machines will also effect a great saving in the labor required to plant as many rows as the planter, and that the device is inexpensive to manufacture and the parts thereof are arranged so that the operator can easily manipulate the machine regardless of its size and the number of planting mechanisms employed.

Other objects and advantages of the invention will become apparent during the course of the following description.

In the accompanying drawings forming a part of the description and wherein like numerals are employed to designate like parts throughout the several views:—

Figure 4 is a vertical transverse section through one of the seed feeding mechanisms.

Figure 1:
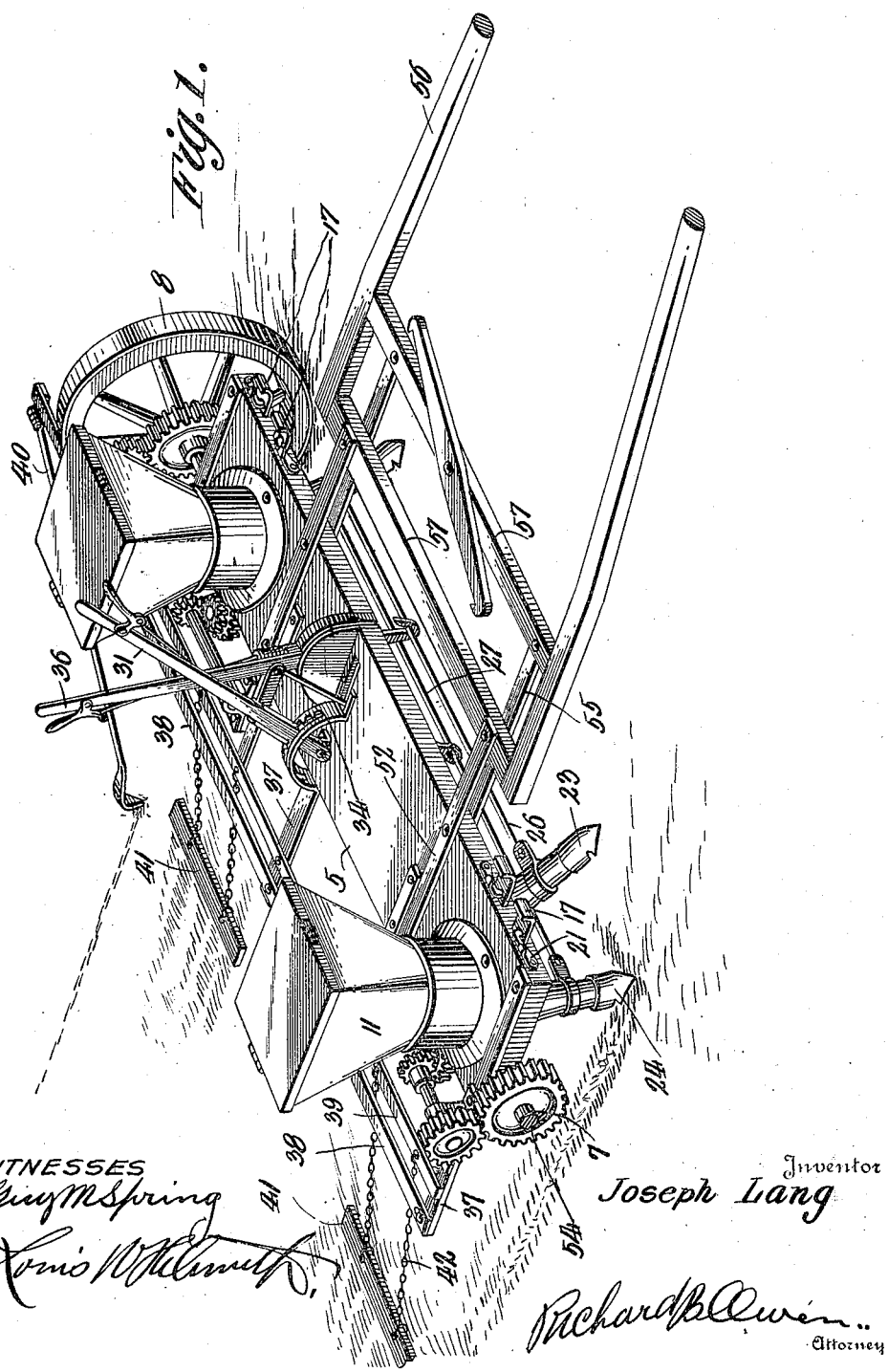
Figure 1 is a perspective view of the planter.

In the drawings wherein for the purpose of illustration is shown the preferred embodiment of my invention, the numeral 5 designates the main frame of the planter which in the present instance consists of an elongated platform whereby the operator may conveniently walk around while controlling the various seed dropping mechanisms. This platform is preferably an elongated plank, the longitudinal dimension of which is arranged transversely of the line of travel of the planter. An axle 6 is fastened to the underside of the longitudinal rear edge of the platform with its ends extended beyond the ends of the platform and reduced to form skeins 7 upon which are mounted ground engaging wheels 8.

In order that the planter will be able to seed more than one row at a time, the platform 5 adjacent each end thereof is provided with a circular recess 9 as best seen in Figure 4, which recesses are arranged so as to incidentally remove portions at the rear edge of the platform so that drive means for the seed feeding plates 10 which are revolvably mounted in the recesses can operate upon the feeding plates to impart thereto the desired movement. Covering each recess 9 and rising above the platform is a seed hopper 11 preferably assuming the form as illustrated herein, and having its lower edge provided with an outstanding flange 12 to be bolted or otherwise fastened to the platform surrounding the recess 9 for the feed plate 10. In the present instance, I have illustrated a hinged closure for each seed hopper which will form seats for the operator when the machine is in use.

Figure 3:
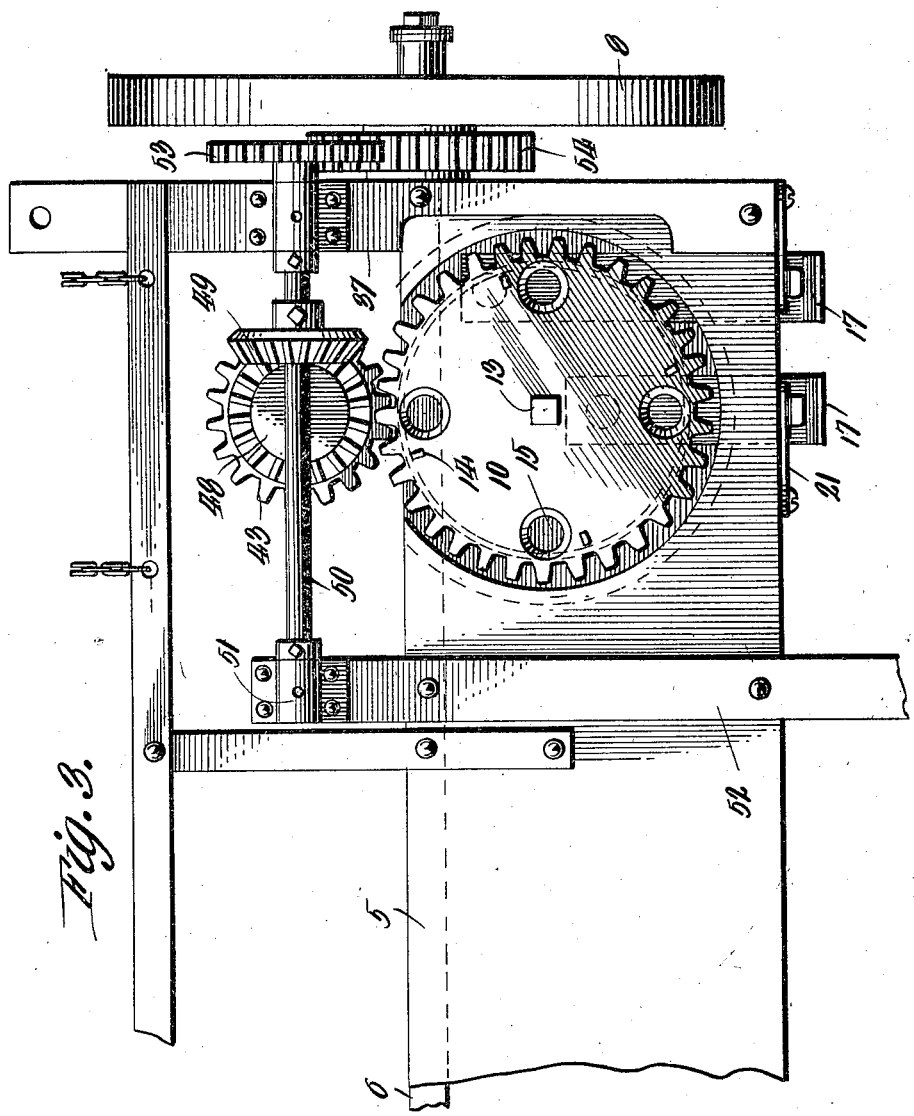
Figure 3 is a top plan of one end of the planter with a seed hopper removed from the seed feeding mechanism.

As stated before, a seed feeding plate 10 is revolubly mounted in each recess 9 in the platform, and a vertically disposed bolt or axle 13 extending through the platform forms a centering pin or axle for each feed plate. The periphery of each feed plate is provided with gear teeth as shown for receiving movement from means to be hereinafter described. From Figure 3 it will be noted that the teeth of the feed plates project beyond the rear edge of the platform by reason of the arrangement of the recesses 9. The top faces of the feed plates are equipped with upstanding projections 14 which provide agitators for preventing the seed from clogging the hoppers. Each feed plate 10 is provided with a plurality of discharge openings 15 arranged circumferentially thereof, and in the present instance the openings are spaced apart to insure a uniform distance between the seeds deposited in the rows.

That portion of the platform forming the bottom of each recess 9 is equipped with a pair of openings 16 which extend entirely through the platform and which are adapted for registry with the outlet openings 15 of the seed plates. These openings 16 are of course spaced the same distance from the center pin 13 as the openings in the feed plates are from their respective pins, and it is to be understood that as many of these openings 16 as are desired may be provided for cooperation with each feed plate. However, it is to be particularly noted that these two openings 16 are spaced apart transversely of the planter and that the openings adjacent the opposite end of the platform of the planter are similarly arranged so that when all of the openings 16 are put into play, four distinct rows of seed may be planted at the same time, and obviously by increasing the number of seed dropping mechanisms or the number of openings 16 associated with each seed dropping mechanism after increasing the diameters of the seed plates 10, the number of rows planted by the machine can be increased in accordance with the desires of the farmer.

In order to control the discharge of seeds through the openings 16, an independent and separate valve means is provided to cooperate with each opening 16 and consists of a reciprocating slide plate slidably mounted in a suitably shaped recess which intersects its respective opening 16. Preferably, the forward ends of these seed regulators project beyond the forward longitudinal edge of the platform 5 and are turned upwardly as at 18 to form convenient grips or handles.

The inner end of each slide plate 17 which operates within the platform 5 is equipped with an opening 19 adapted for registry and non-registry with its respective opening 16. The opposite end of each slide is provided with a pair of spaced apertures 20 for cooperation with a pivoted latch 21, one being provided for each slide, whereby a slide plate can be locked with its opening 19 in or out of registry with its respective opening 16. The latches 21 are pivoted to the forward edge of the platform 5 and as the two slide plates 17 of each seed discharging mechanism are arranged in close proximity to one another, the seed dropping mechanism can be controlled conveniently.

A seed drill tube or shoe 22 is provided for each opening 16 in the platform and are arranged in sets 23 and 24, the two shoes 23 being associated with the openings 16 at each end of the platform which are arranged closer to the center thereof. The other set of shoes 24 are associated with the openings 16 which are arranged adjacent the ends of the platform 5. Each shoe or drill is hinged as at 25 at its relative forward point to the underside of the platform in advance of its respective opening 16 so that they may be swung out of engagement with the ground as shown in the drawings, or pivoted so that their upper ends abut the bottom of the platform and their points engage the earth to form the furrow. A rod 26 connects the set of drills 23, while a similar rod 27 connects the drills constituting the set 24. The intermediate portion of this last mentioned rod is loosely received in a downwardly inclined slot provided in the flattened lower end of a depending rod 28, the upper end of which is pivotally connected as at 29 to a laterally extending arm 30 of a ratchet lever 31 and projects forwardly of the planter as shown. A slot 32 is provided in the platform of the planter for the passage and movement of the rod 28. The lower end of the ratchet lever 31 is pivoted to the platform 5 of the planter and this lever is provided with any kind of detent 33 for cooperation with an arcuated guide secured to the platform and provided with spaced openings for the reception of the detent for holding the lever in any desired adjusted position and consequently the set of shoes 24 in corresponding positions. The detent 33 is of course actuated by a pivoted grip located adjacent the handle end of the lever 31 in the well known manner.

The intermediate portion of the rod 26 connecting the set of drills 23 is also loosely received in a downwardly inclined slot 35 provided in the lower end of a lever 36 fulcrumed between its ends to a lever guide 37 similar to the guide 34 hereinbefore mentioned with the addition of sides as shown to form a support for the fulcrum pin, and a slot is of course provided in the platform to permit the lever 36 to depend below the platform and have a connection with the rod 26. The lever 36 is also provided with the usual detent for cooperation with the guide 37 for retaining the set of drills 23 in the desired adjusted positions.

The platform 5 of the planter is equipped with a rearwardly projecting extension to form a support and attaching means for the parts of the planter which will be hereinafter described. This extension is provided by fastening the inner ends of rearwardly projecting bars 37 to the platform and fastening to these bars elongated bars 38 and 39 arranged transversely of the planter. The transverse bar 38 has its left hand end extended laterally of the planter platform and slightly beyond the left hand ground engaging wheel 8 whereby a marker 40 can be pivotally connected to the extended end of the bar at its upper end so that the lower end of the marker will rest upon the ground under its own weight. Obviously, this marker when its use is not desired can be swung vertically to extend forwardly of the planter and secure its support by abutment with the extended end of the bar 38. A pair of seed covering or furrow closing devices are provided for the planter inasmuch as two sets of drills are employed in the present instance, and each furrow closing device consists of a drag board 41 connected by a pair of chains 42 to the rearmost transverse bar 38 of the extension frame. These devices are of course connected to the planter so that they follow behind the drills located at each end of the planter so that the furrows made by each pair will both be closed as the planter passes over the ground.

Figure 2:
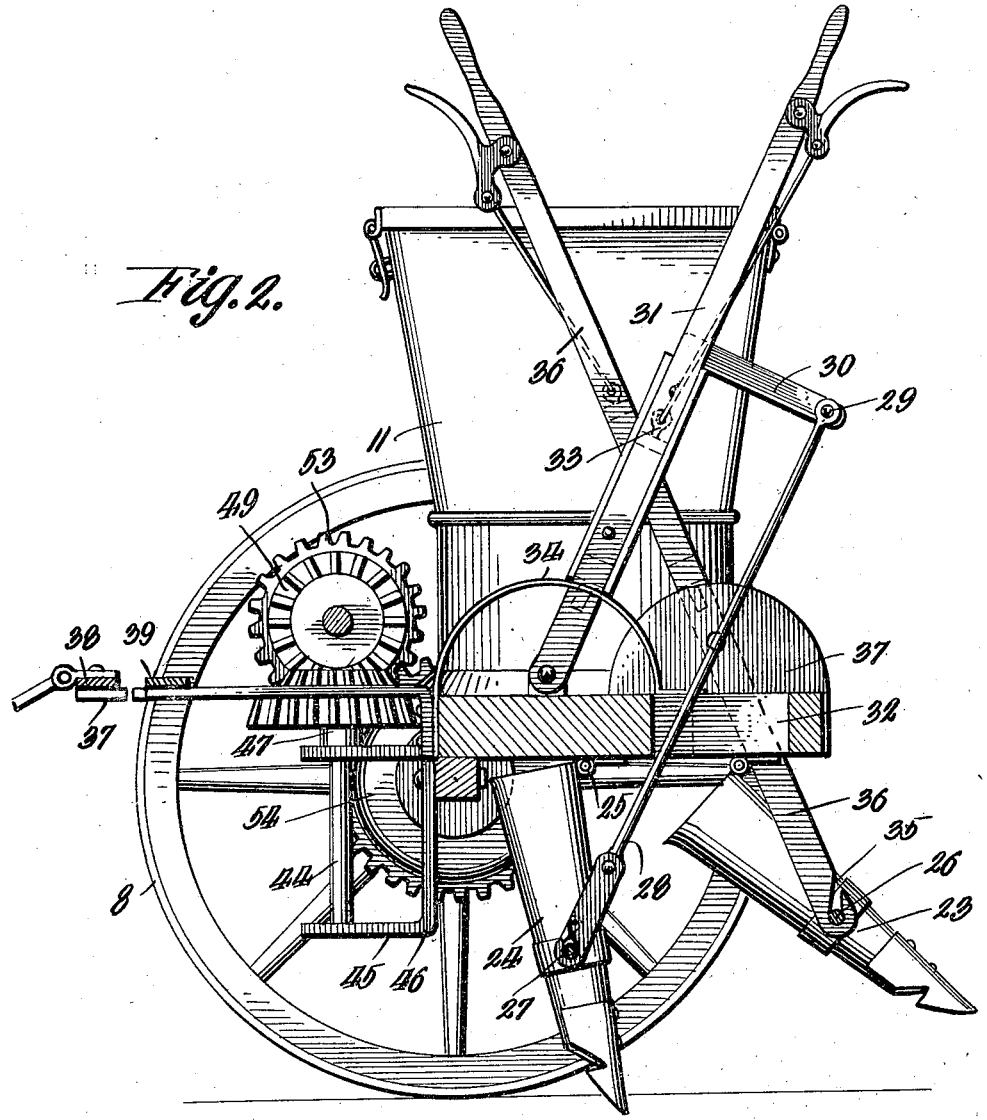
Figure 2 is an enlarged vertical transverse section through the same.

The means for revolving each seed feeding or discharge plate 10 is the same, therefore a description of one will suffice for both. It will be remembered that the teeth of the seed feeding plates 10 travel beyond the rear edge of the platform 5 and to engage the teeth of each feed plate, I provide a pinion 43 for each feed plate and key the same to a vertical stub shaft 44 which is journalled in the right angularly disposed ends 45 of a bracket 46 fastened to the axle of the planter directly in back of the center pin or axle 13 of the respective feeding plate 10, and the pinion 43 is supported above the uppermost end 45 of its respective bracket by a collar 47 disposed between said end of the bracket and the pinion as clearly shown in Figures 2 and 4. To the top face of the pinion 43 is secured a beveled gear 48 adapted for mesh with a similar gear 49 keyed to a shaft 50 extending transversely of the standard and is journalled in bearings 51, one of which is carried by the end bar 37, while the other is mounted upon the rearwardly projecting end of a bar 52 forming part of the draft means. One end of this shaft 50 is extended laterally beyond its respective end bar 37 and the platform 5 and is there provided with a relatively small pinion keyed thereto. This pinion is adapted for mesh with a relatively larger gear 54 which is secured to the inner sides of the spokes of the ground engaging wheel 8 adjacent the seed dropping mechanism with which it is allied. Of course, it will be apparent that one set of gears 53 and 54 may be dispensed with by simply extending one of the shafts 50 entirely across the planter frame so that power to both seed dropping mechanisms may be transmitted thereto from only one of the ground engaging wheels 8. Due to the fact that the operating gears for each seed dropping mechanism are of substantially the same size and are arranged the same, it will be seen that the openings 16 of each seed dropping mechanism come into registry with a pair of the apertures 15 in the seed feeding plates 10 simultaneously, although the feeding plates 10 revolve in opposite directions. However, it is not essential that both seed feeding plates revolve in opposite directions, for the same result can be obtained by providing a single drive shaft 50 for both seed dropping mechanisms whereby both feeding plates will be driven in the same direction.

A bar 52 is secured to the upper face of the platform 5 at each side of the drill adjusting levers 31 and 36, and a similar bar 55, only longer than the bars 52, is fastened to the underface of the platform directly beneath each bar 52 whereby a draft shaft 56 having a pair of spaced transversely extending bars 57 can be secured to and between each pair of bars 52 and 55.

In operation, when it is desired to plant only two rows at a time, the lever 36 is swung rearwardly so as to cause the set of drills 23 to be elevated. The lever 31 is swung forwardly as shown in Figure 1 so as to dispose the set of drills 24 which are arranged farthest apart, in approximately vertical position, so that their upper ends abut the bottom of the platform 5 and are disposed in position to form furrows and to align with their respective seed outlet openings 16 in the platform. The slide valves 17 which cooperate with the innermost openings 16 of the two seed dropping mechanisms are moved inwardly so as to close said outlets 16 in the platform, after which the latches 21 associated with these valves are swung downwardly to pass through the outermost apertures 20 in the valves to lock the latter in closed position. The valves 17 are moved outwardly so as to open their respective outlet openings 16 whereby upon forward movement of the planter, both seed feeding plates 10 will be revolved and as the openings 15 therein come into registry with the outermost outlet openings 16 in the platform, seeds will be permitted to pass into the drills 24 and be deposited in the furrows formed by the drills in the usual manner. During movement of the seed feeding plates 10, the upstanding agitators 14 thereof will keep the seeds stirred up in the hopper 11 so as to prevent clogging of the seeds and to facilitate distribution thereof and easy flow through the openings 15 and 16 as they come into registry.

When it is desired to plant the rows closer together and to bring the set of drills 23 into operation and the set 24 out of operation, the positions of the levers 31 and 36 are reversed from their positions as shown in Figure 1 so that the set of drills 23 will be engaged with the ground, while the set 24 will be lifted out of engagement therewith. The positions of the slide valves 17 are just reversed so that the innermost discharge openings 16 in the platform are opened, while the outermost openings 16 are closed. However, when it is desired to plant four rows, both sets of drills are disposed in position to engage the ground while all of the slide valves are moved forwardly of the platform so that all discharge openings 16 in the platform will be opened. However, it will be seen that the four rows will be arranged in pairs, the rows of each pair being disposed in rather close proximity to one another. This close arrangement of the rows of one pair is due to the distance between the discharge openings 16 of each seed dropping mechanism and obviously when the seed feeding plates 10 are made larger so that the apertures 15 therein can be spaced farther apart, it will be seen that the rows planted by each seed dropping mechanism will be disposed farther apart. Of course, as many seed dropping mechanisms may be associated with the planter so that as many rows can be planted by the machine during its forward travel as desired.

Due to the fact that more than one seed drill is associated with each seed dropping mechanism, it will be seen that the distance between the seeds planted can be varied at will, and that when it is desired to plant the seeds relatively far apart, one of the slide valves 17 is closed so that only one seed is dropped by the mechanism at each quarter turn of the seed feeding plate thereof. However, when both slide valves 17 are opened, it will be obvious that two seeds are dropped at each quarter turn of the seed feeding plate, and twice as many seeds can be accurately planted equal distances apart with the provision of two drills to each dropping mechanism as could be planted by the association of only a single drill with each mechanism. Therefore, besides the machine containing the advantage of easily regulating the distance between rows of vegetation, it can also be manipulated so that as many seeds to the foot can be dropped or planted as may be desired.

The foregoing description and the accompanying drawings have reference to the preferred or approved embodiment of my invention. It is to be understood, however, that such changes may be made in construction and arrangement of parts, materials, dimensions, etc., as may prove expedient and fall within the scope of the appended claims.

Having thus described and illustrated my invention, I claim:—

1. In a planter, the combination with a pair of seed dropping mechanisms carried by the planter; of a pair of seed drills associated with each seed dropping mechanism arranged in spaced relation to each other transversely of the planter, means for connecting corresponding seed drills of the seed dropping mechanisms, and separate operating means associated with each of aforesaid means for moving the drills into and out of operative positions.

2. In a planter including a frame, a pair of seed dropping mechanisms carried by the frame, a pair of seed drills associated with each seed dropping mechanism arranged in spaced relation to each other transversely of the planter and pivotally secured to the frame, a rod connecting corresponding seed drills of the seed dropping mechanisms together, and separate levers operatively associated with each of the rods for moving the drills into and out of operative positions.

In testimony whereof I affix my signature in presence of two witnesses.

JOSEPH LANG.

Witnesses:
W. C. HUNTING,
BEN CONRADYS.